(12) United States Patent
Hemphill et al.

(10) Patent No.: US 8,776,971 B2
(45) Date of Patent: Jul. 15, 2014

(54) STATOR AND ONE-WAY CLUTCH ASSEMBLY FOR A TORQUE CONVERTER

(75) Inventors: Jeffrey Hemphill, Copley, OH (US); Michael Vansickle, Akron, OH (US); Christian Huegel, Rheinan (DE); Yannick Strub, Soufflenheim (FR); J. Kevin Brown, Rock Hill, SC (US); Peter Kennedy, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1506 days.

(21) Appl. No.: 11/728,068

(22) Filed: Mar. 23, 2007

(65) Prior Publication Data

US 2007/0220874 A1 Sep. 27, 2007

Related U.S. Application Data

(60) Provisional application No. 60/785,790, filed on Mar. 24, 2006.

(51) Int. Cl.
*F16H 41/24* (2006.01)
*F16H 45/00* (2006.01)
*F16D 41/18* (2006.01)

(52) U.S. Cl.
USPC ................ 192/3.21; 192/46; 60/345

(58) Field of Classification Search
CPC .......... F16H 41/24; F16H 45/00; F16D 41/18
USPC ............... 192/3.21, 46; 60/343, 345
See application file for complete search history.

(56) References Cited

U.S. PATENT DOCUMENTS

| 2,034,429 A * | 3/1936 | de Lavaud ............... 60/343 |
| 2,356,310 A * | 8/1944 | Gass ............... 267/161 |
| 2,461,217 A * | 2/1949 | Lapsley et al. ........... 188/82.4 |
| 3,039,834 A * | 6/1962 | Howe ............... 384/29 |

(Continued)

FOREIGN PATENT DOCUMENTS

| EP | 0753686 | 5/2000 |
| EP | 0732527 | 6/2002 |
| WO | 99/04177 | 1/1999 |

OTHER PUBLICATIONS

U.S. Appl. No. 11/726,881 George et al., filed Mar. 23, 2007.

(Continued)

*Primary Examiner* — David D Le
*Assistant Examiner* — Terry Chau
(74) *Attorney, Agent, or Firm* — Simpson & Simpson, PLLC

(57) ABSTRACT

The present invention broadly comprises a stator and clutch assembly in a torque converter. The stator has a segment radially disposed between stator blades and a stator axis. The one-way clutch has a plate connected to a hub. The segment forms a portion of the clutch and the stator is axially displaceable to control operation of the clutch. A displacement element urges the stator in a first axial direction. The stator is arranged to move in a second axial direction, opposite the first axial direction, in response to pressure from fluid in the torque converter. In some aspects, the displacement element is selected from the group consisting of a coil spring and a wave spring. In some aspects, the one-way clutch is arranged to disengage when the stator is sufficiently displaced in the first direction and to engage when the stator is sufficiently displaced in the second direction.

2 Claims, 5 Drawing Sheets

(56) References Cited

U.S. PATENT DOCUMENTS

| | | | |
|---|---|---|---|
| 3,149,467 A * | 9/1964 | Knowles | 60/343 |
| 3,300,971 A * | 1/1967 | Qualman et al. | 60/341 |
| 3,385,060 A * | 5/1968 | Lazarus | 60/341 |
| 3,572,034 A * | 3/1971 | Fisher | 60/341 |
| 3,724,208 A * | 4/1973 | Welch et al. | 60/343 |
| 5,070,978 A | 12/1991 | Pires | |
| 5,449,057 A | 9/1995 | Frank | |
| 5,465,575 A * | 11/1995 | Shimmell | 60/345 |
| 5,597,057 A | 1/1997 | Ruth et al. | |
| 5,718,114 A | 2/1998 | Murata et al. | |
| 5,806,643 A | 9/1998 | Fitz | |
| 5,829,565 A | 11/1998 | Fergle et al. | |
| 5,852,932 A | 12/1998 | Matsumoto | |
| 5,853,073 A | 12/1998 | Costin | |
| 5,918,461 A * | 7/1999 | Bacon | 60/343 |
| 5,918,715 A | 7/1999 | Ruth et al. | |
| 6,505,721 B1 | 1/2003 | Welch | |
| 6,571,926 B2 | 6/2003 | Pawley | |
| 6,749,051 B2 | 6/2004 | Muramatsu | |
| 2007/0045076 A1 | 3/2007 | Brees et al. | |

OTHER PUBLICATIONS

U.S. Appl. No. 11/728,066 Brees et al., filed Mar. 23, 2007.

* cited by examiner

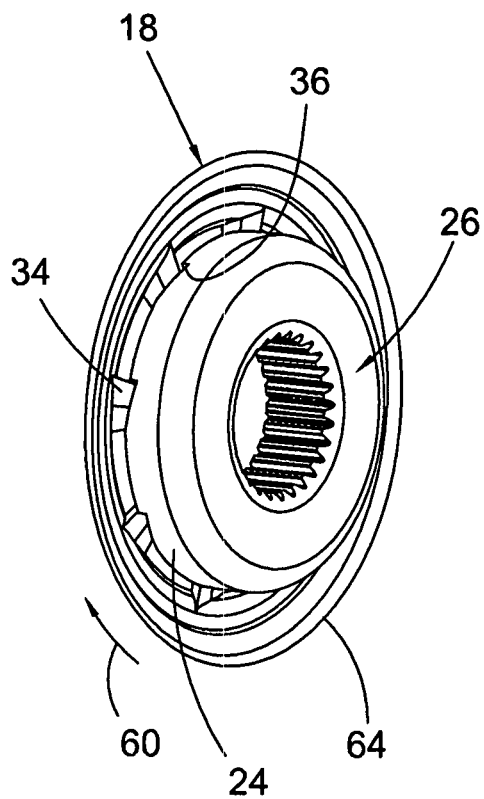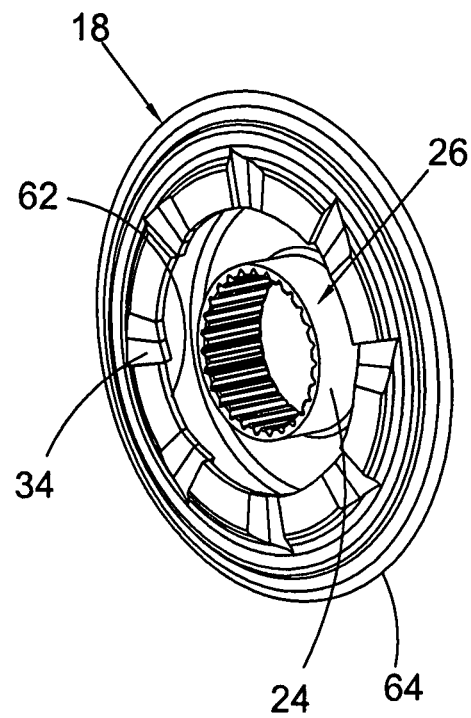
Fig. 7
Fig. 8

STATOR AND ONE-WAY CLUTCH ASSEMBLY FOR A TORQUE CONVERTER

CROSS-REFERENCE TO RELATED APPLICATIONS

This application claims the benefit under 35 U.S.C. §119(e) of U.S. Provisional Application No. 60/785,790 filed Mar. 24, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to an assembly for a torque converter combining a stator and one-way clutch. Specifically, the assembly includes parts or components shared by the stator and the clutch.

BACKGROUND OF THE INVENTION

An axially engaging and disengaging one-way clutch mechanism for a torque converter is shown in commonly assigned U.S. Provisional Patent Application No. 60/710,828, titled "STATOR HAVING AN AXIALLY ENGAGING AND DISENGAGING ONE-WAY CLUTCH MECHANISM FOR A TORQUE CONVERTER," inventors Brees et al., filed Aug. 24, 2005, which application is incorporated as background information by reference. The arrangement shown in the above application could be improved if parts or components could be shared between the stator and the clutch. Such sharing could reduce the parts count, complexity, and cost for the torque converter.

Thus, there is a long-felt need to combine components for a stator and a one-way clutch in a torque converter to reduce parts count, complexity, and cost for the stator and one-way clutch.

BRIEF SUMMARY OF THE INVENTION

The present invention broadly comprises a stator and clutch assembly in a torque converter including a stator with a first segment radially disposed between blades for the stator and a longitudinal axis for the stator and a one-way clutch with a first plate connected to a hub. The first segment is configured to form a portion of the one-way clutch and the stator is axially displaceable to control operation of the clutch. The assembly further includes a displacement element urging the stator in a first axial direction. The torque converter further comprises a fluid and the stator is arranged to move in a second axial direction, opposite the first axial direction, in response to pressure from the fluid. In some aspects, the displacement element is disposed between the first segment and the first plate. In some aspects, the displacement element is selected from the group consisting of a coil spring and a wave spring. In some aspects, the one-way clutch is arranged to disengage when the stator is sufficiently displaced in the first direction and to engage when the stator is sufficiently displaced in the second direction.

In some aspects, the first segment comprises a substantially annular disc having at least one axial protrusion and the first plate comprises at least one indentation axially aligned with the at least one protrusion. The at least one indentation and the at least one first axial protrusion are arranged to lockingly engage. In some aspects, the first plate comprises at least one axial protrusion and the first segment comprises a substantially annular disc having at least one indentation axially aligned with the at least one protrusion. The at least one indentation and the at least one first axial protrusion are arranged to lockingly engage.

In some aspects, the assembly includes a wear-prevention element and the stator further comprises a second segment disposed between the blades and the axis. The wear-prevention element is disposed between the second segment and the first plate. In some aspects, the assembly includes a third segment disposed between the blades and the axis and the third segment and the first plate are in contact.

The invention also broadly comprises a stator and clutch assembly in a torque converter including a one-way clutch with a plate connected to a hub, a stator with a segment radially disposed between blades for the stator and a longitudinal axis for the stator and forming a portion of the clutch, and a displacement element arranged to urge the stator in a first axial direction. The torque converter includes a fluid, the stator is arranged to move in a second axial direction, opposite the first axial direction, in response to pressure from the fluid, the one-way clutch is arranged to freely rotate when the stator is sufficiently displaced in the first direction, and the one-way clutch is arranged to lockingly engage when the stator is sufficiently displaced in the second direction.

The invention further broadly comprises a stator and clutch assembly in a torque converter including a one-way clutch with a plate connected to a hub, a stator with a segment radially disposed between blades for the stator and a longitudinal axis for the stator and forming a portion of the clutch, and a displacement element arranged to urge the stator in a first axial direction. The torque converter includes a fluid, the stator is arranged to move in a second axial direction, opposite the first axial direction, in response to pressure from the fluid, the segment comprises a substantially annular disc having at least one radial protrusion, and the plate comprises at least one indentation axially aligned with the at least one protrusion.

It is a general object of the present invention to provide a stator and one-way clutch for a torque converter having at least one segment in common.

It is another object of the present invention to reduce the parts count and complexity for a stator and one-way clutch in a torque converter.

It is yet another object of the present invention to provide a more easily assembled stator and one-way clutch for a torque converter.

It is a further object of the present invention to provide a stator and one-way clutch made using more cost-effective fabricating processes.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 7 is a back perspective view of a stator segment and hub in a present invention stator and clutch assembly; and, FIG. 8 is a front perspective view of the segment and hub shown in FIG. 7.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
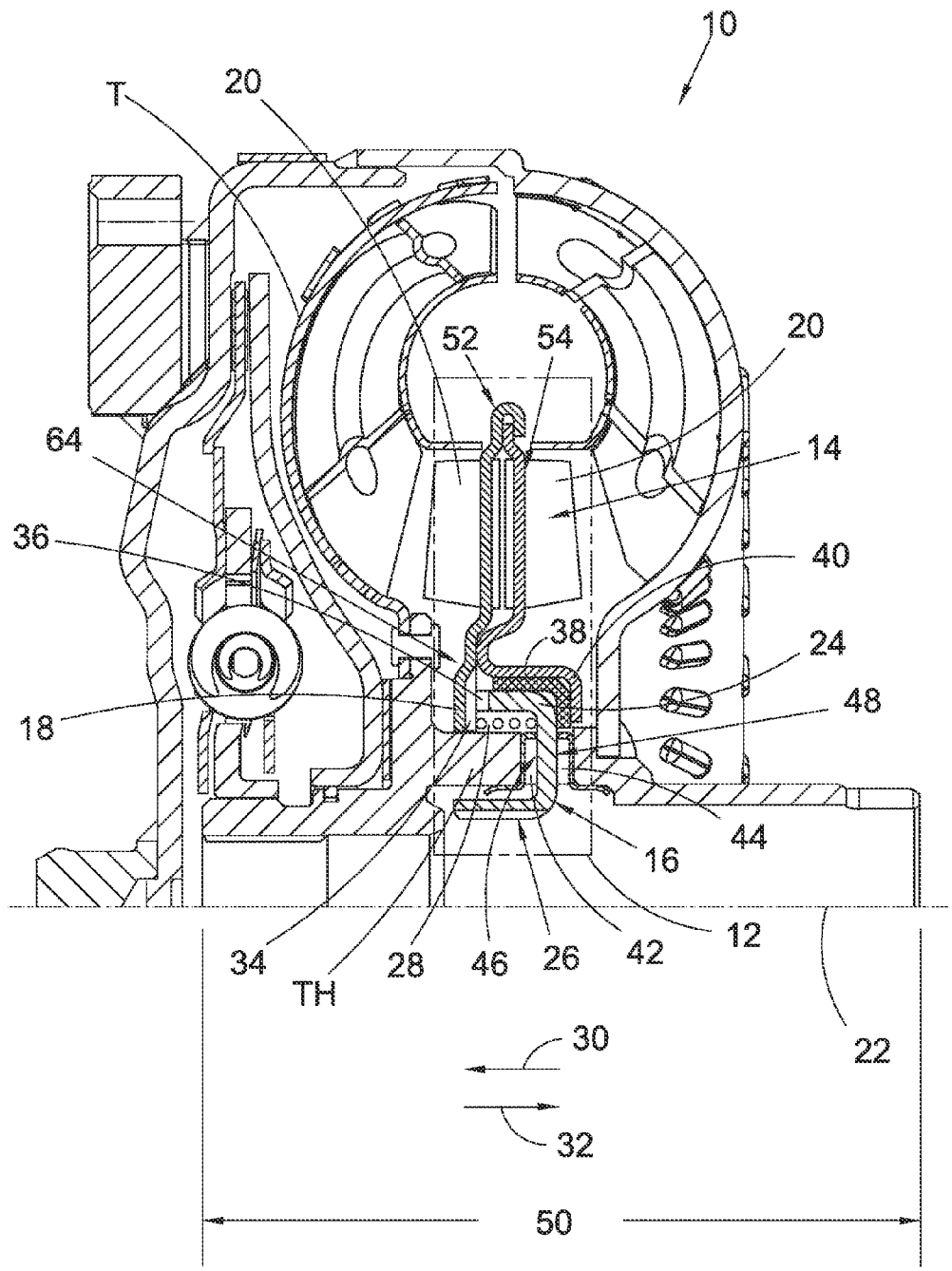
FIG. 1 is a partial cross-section of a present invention stator and clutch assembly in a torque converter with the clutch in a free-wheel mode.

FIG. 1 is a partial cross-section of a present invention stator and clutch assembly in torque converter 10 with the clutch in a free-wheel mode.

Figure 2:
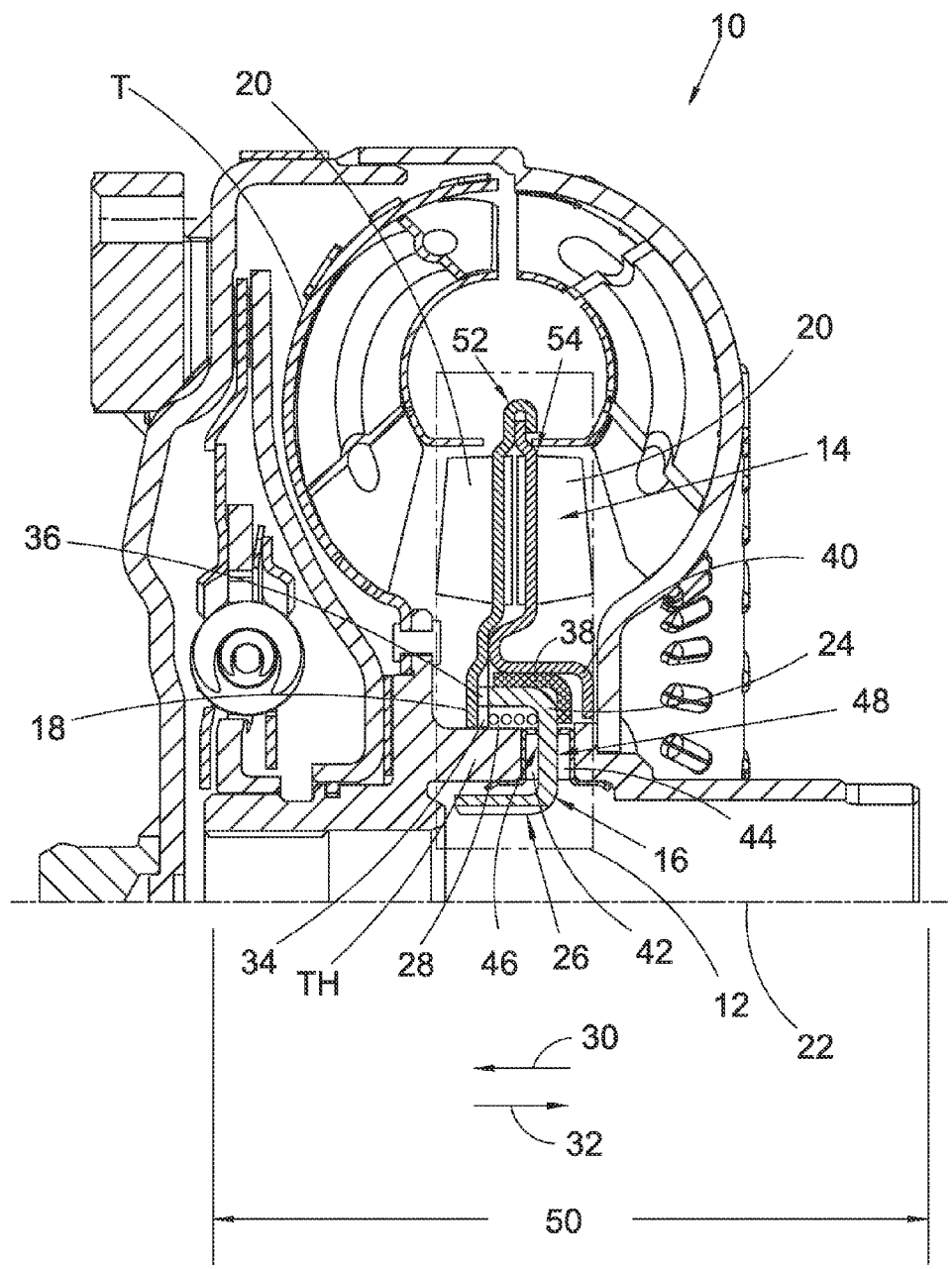
FIG. 2 is a partial cross-section of the stator and clutch assembly shown in FIG. 1 with the clutch in a locked mode.

FIG. 2 is a partial cross-section of the stator and clutch assembly shown in FIG. 1 with the clutch in a locked mode. The following should be viewed in light of FIGS. 1 and 2. Converter 10 includes turbine T, turbine hub TH, and clutch assembly 12. Hub TH is non-rotatably connected to turbine T. Assembly 12 is approximately outlined by the respective boxes shown in FIGS. 1 and 2. However, it should be understood that assembly 12 is defined by the specification and claims. Assembly 12 includes stator 14 and one-way clutch 16. Stator 14 includes segment 18 radially disposed between blades 20 for the stator and longitudinal axis 22. Clutch 16 includes plate 24. In some aspects, plate 24 and hub 26 are integral, that is, formed from a single piece of material. As further described infra, segment 18 and plate 24 are configured to form a portion of one-way clutch 16 and stator 14 is axially displaceable, that is, moveable parallel to axis 22, to control operation of the clutch.

Blades 20 can be formed by any means known in the art. In some aspects (not shown), one-part blades are used. Two-part blades are shown in the figures, for example, as described in the commonly assigned United States Provisional Patent Application titled "TWO-PART STATOR BLADE," inventors Brees et al., filed on the same day as the present application.

Assembly 12 also includes displacement element 28 placed in contact with plate 24 and segment 18. Hub 26 and plate 24 are axially fixed. Stator 14 and segment 18 are axially displaceable. Therefor, displacement element 28 reacts with plate 24 to urge segment 18 and stator 14 in axial direction 30. For example, in FIG. 1, stator 14 is displaced in direction 30. Any means known in the art, including but not limited to a coil spring or a wave spring can be used for element 28.

Torque converter 10 is at least partially filled with a fluid (not shown). The pressure and direction of flow of the fluid in converter 10 is variable in response to the mode of operation of the converter. In some modes, fluid pressure against stator 14, in particular, blades 20 and segment 18, causes the stator and segment 18 to move in axial direction 32, opposite direction 30. For example, in FIG. 2, the stator is displaced in direction 32.

The movement of stator 14 in directions 30 and 32 is used to control the operation of clutch 16. That is, in one direction, clutch 16 is engaged and in the other direction, the clutch is disengaged (free wheels). In some aspects, the one-way clutch is arranged to disengage when the stator is sufficiently displaced in direction 30 and to engage when the stator is sufficiently displaced in direction 32. However, it should be understood that in some aspects the configuration of the clutch, and the operation of the clutch with respect to directions 30 and 32, can be reversed. By sufficiently engaged, we mean that the stator is moved far enough in the respective direction to activate or deactivate the clutch mechanism further described infra.

As noted supra, segment 18 and plate 24 are configured to form a portion of one-way clutch 16. In general, segment 18 and plate 24 are configured such that applicable portions of the segment and plate engage and lock when the stator is operating in the lock mode, that is, when rotational energy from the stator is to be transferred to hub 26. Further, the applicable portions are arranged so that the segment and plate rotate independently, for example, slide over each other, without locking when the stator is operating in the free wheel mode, that is, when the stator and the hub are to be rotationally disconnected. In some aspects, segment 18 is a substantially annular disc having at least one axial protrusion 34 and plate 24 includes at least one indentation 36 axially aligned with protrusions 34. By axially aligned, we mean the protrusions and the indentations are aligned parallel to a longitudinal, or rotational, axis for the torque converter. In general, assembly 12 includes equal pluralities of protrusions and indentations. In some aspects (not shown), plate 24 includes protrusions and segment 18 includes axially aligned indentations.

Any means known in the art can be used to form applicable one-way clutch portions in segment 18 and plate 24. In addition, in some aspects, a ramp and slot arrangement as described in the commonly assigned U.S. Provisional Patent Application No. 60/710,828, titled "STATOR HAVING AN AXIALLY ENGAGING AND DISENGAGING ONE-WAY CLUTCH MECHANISM FOR A TORQUE CONVERTER," inventors Brees et al., filed Aug. 24, 2005, can be used. It should be understood that other and additional components for clutch 16 are included within the spirit and scope of the invention as claimed.

In some aspects, assembly 12 includes wear-prevention element 38 disposed between segment 40 and plate 24. Segment 40 is disposed between blades 20 and axis 22. Element 38 can be any wear-prevention device known in the art, including, but not limited to, a bushing. In some aspects (not shown), segment 40 is in direct contact with plate 24. Typically, segment 40 is softer than plate 24, facilitating this direct contact.

Plate 24 is axially fixed by bearings 42 and 44. In some aspects, inner axial faces 46 and 48, respectively, of bearing 42 and 44 are in direct contact with plate 24. That is, the washers (not shown) normally placed between the bearings and the plate are eliminated and plate 24 acts as respective races for the bearings. Eliminating the washers advantageously reduces axial width 50 of converter 10. In general, this arrangement is facilitated by the hardening of hub 26, and plate 24, for engagement of the hub with a stator shaft (not shown).

In some aspects, stator 14 is formed from two axially distinct segments as described in the commonly assigned United States Provisional Patent Application titled "INTEGRAL STATOR AND ONE-WAY CLUTCH," inventors George et al., filed the same day as the present invention. For example, stator 14 includes segments or axial halves 52 and 54. In FIGS. 1 and 2, segment 18 is integral to segment 52 and segment 40 is integral to segment 54. In some aspects, stator 14 is formed by stamping. For example, segments 52 and 54 are each formed from stamped metal pieces.

Figure 3:
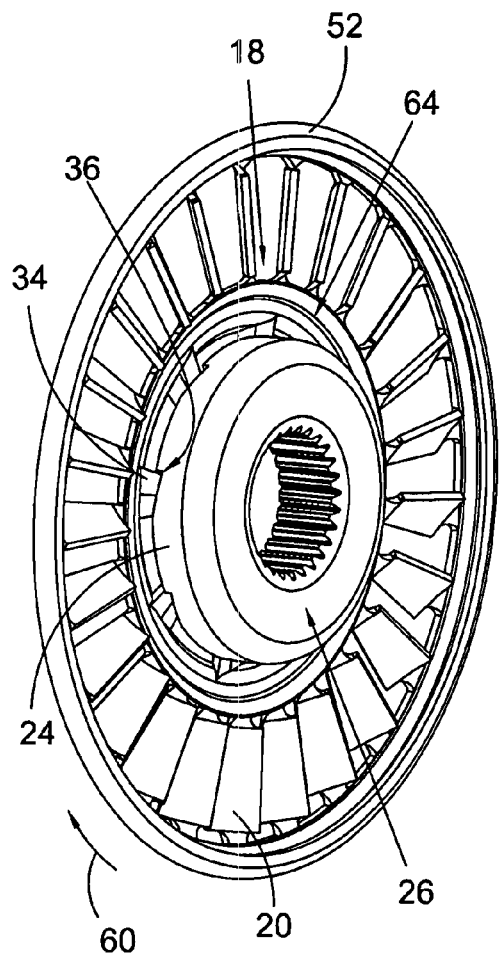
FIG. 3 is a back perspective view of an axial half and hub shown in FIG. 1.

FIG. 3 is a back perspective view of half 52 and hub 26 shown in FIG. 1.

Figure 4:
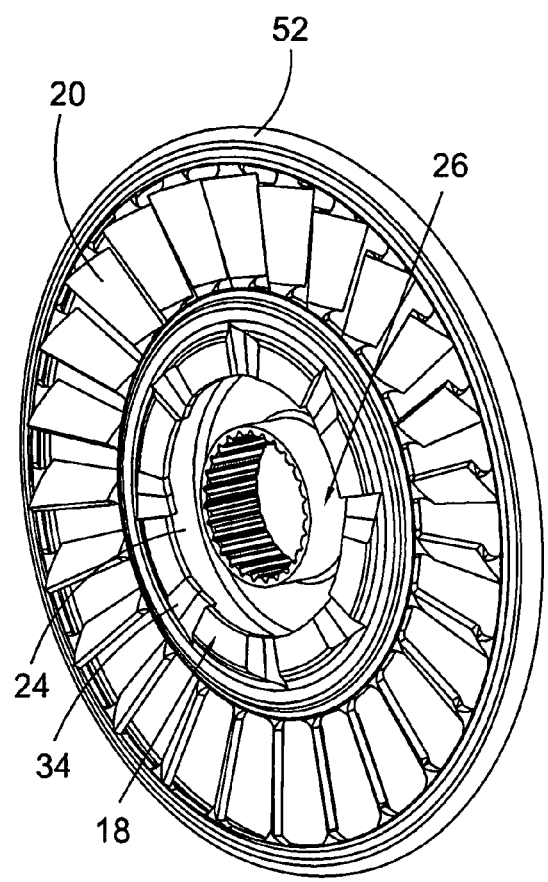
FIG. 4 is a front perspective view of the axial half and hub shown in FIG. 3.

FIG. 4 is a front perspective view of half 52 and hub 26 shown in FIG. 3.

Figure 5:
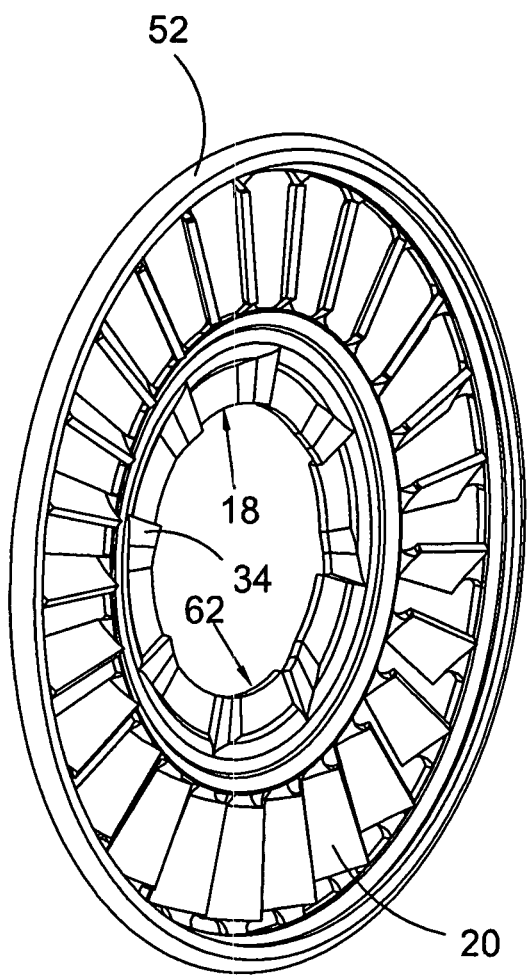
FIG. 5 is a back perspective view of the axial half shown in FIG. 3.

FIG. 5 is a back perspective view of axial half 52 shown in FIG. 3.

Figure 6:
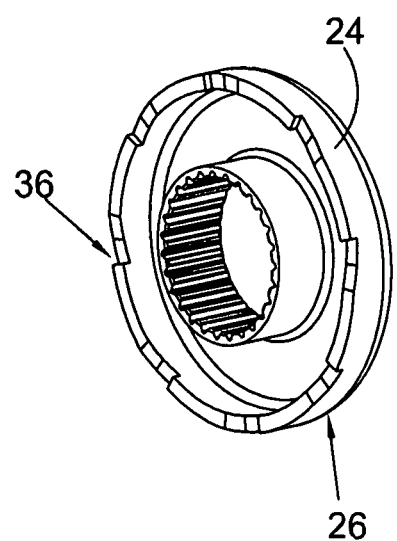
FIG. 6 is a front perspective view of the hub shown in FIG. 3.

FIG. 6 is a front perspective view of hub 26 shown in FIG. 3. The following should be viewed in light of FIGS. 1 through 6. Segment 18 can be formed in any way known in the art. In FIGS. 1 and 2, segment 18 is formed integrally with stator 14. FIGS. 3 through 6 provide further details, in particular, regarding protrusions 34 and indentations 36.

Segment 18 includes ramp-like protrusions 34 and hub 26 includes indentations 36. The indentations are substantially notch-shaped and the protrusions and indentations are complimentarily configured so that the protrusions and indentations snuggly engage when segment 18 rotates in direction 60, for example, as shown in FIG. 3. The individual configurations of protrusions 34 and indentations 36 are shown in FIGS. 5 and 6, respectively. It should be understand that assembly 12 is not limited to any particular shape, size, or configuration of protrusions and indentations.

As described supra, fluid pressure against the stator causes the stator to axially move and this movement is used in the operation of the one-way clutch. In some aspects, the segment 18 is radially continuous from an inner to an outer circumference. For example, in FIGS. 1 through 5, segment 18 is continuous from inner circumference 62 to outer circumference 64. That is, segment 18 provides a continuous surface against which fluid in stator 14 can exert force. Therefore, pressure against segment 18 exerts additional axial force against the stator, facilitating the axial movement of the stator and subsequent operation of clutch 16.

FIG. 7 is a back perspective view of an axial half and hub in a present invention stator and clutch assembly.

FIG. 8 is a front perspective view of the axial half and hub shown in FIG. 7. The following should be viewed in light of FIGS. 1 through 8. In FIGS. 7 and 8, segment 18 is a separate piece connected to the remainder of stator 14, for example, half 52, by any means known in the art. FIGS. 7 and 8 provide further details regarding this aspect. The discussion regarding FIGS. 3 through 6 is otherwise applicable to FIGS. 7 and 8.

Returning to FIGS. 1 and 2, advantageously, segments 18 and 40 also form part of clutch 16. For example, segment 18 forms part of an axial end-portion of the clutch, and as described supra, segment 18 also forms part of the locking or engaging mechanism for the clutch. Segment 40 forms part of an axial end-portion of the clutch. That is, clutch 16 is at least partially axially bracketed by segments 18 and 40. Thus, stator 14 and clutch 16 can be manufactured or assembled together, reducing the parts count and complexity. For example, assembly 12 (segment 54, element 38, plate 24/hub 26, element 28, and segment 52) can be stacked in torque converter 10.

Also, assembly 12 forms a "self-contained" unit. That is, once the components of clutch 16 are positioned between segments 18 and 40, the segments hold the components in place and assembly 12 can be stacked as a unit. For example, the assembly could be assembled in one location and then transported elsewhere for stacking in a torque converter. It should be understood that assembly 12 is not limited to the configurations shown in the figures. For example, other sizes, shapes, combinations, configurations, and orientations of component parts of the assembly are included within the spirit and scope of the invention as claimed.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter, comprising:
   a turbine;
   a first hub non-rotatably connected to the turbine; and,
   a stator and clutch assembly including:
      a one-way clutch with a plate connected to a second hub;
      a stator with:
         a plurality of blades;
         a first segment radially disposed between the plurality of blades and a longitudinal axis for said stator and forming a portion of said clutch and including a first plurality of axially extending protrusions; and
         a second segment, formed of a first piece of material different from material forming the plurality of blades, wherein the second segment is disposed radially beyond the plurality of blades, and wherein the first and second segments are formed from a single piece of material; and,
      a displacement element arranged to urge said stator in a first axial direction parallel to an axis of rotation for the torque converter, wherein:
   the plate is formed of one only single piece of material;
   the plate includes:
      a radial portion extending in a radial direction orthogonal to the axis of rotation;
      a first axial portion extending in the first axial direction from a radial end of the radial portion furthest from the axis of rotation and including a second plurality of axially extending indentations; and,
      a second axial portion, located between the first axial portion and the axis of rotation and extending in the first axial direction from a radial end of the radial portion closest to the axis of rotation;
   a portion of the first hub is disposed, in the radial direction between the first and second axial portions;
   said torque converter further comprises a fluid, said stator is arranged to move in a second axial direction, opposite said first axial direction, in response to pressure from said fluid;
   said one-way clutch is arranged to rotate when said stator is sufficiently displaced in said first direction; and said one-way clutch is arranged to lockingly engage the first and second pluralities of axially extending protrusions with each other when said stator is sufficiently displaced in said second direction.

2. A torque converter, comprising:
a turbine;
a first hub non-rotatably connected to the turbine; and,
a stator and clutch assembly including:
   a one-way clutch with a plate connected to a second hub;
   a stator with:
      a first segment radially disposed between blades for said stator and a longitudinal axis for said stator and forming a portion of said clutch;
      a second segment to which a first plurality of the blades are directly attached; and
      a third segment formed from a first piece of material different from a second piece of material forming the second segment; and,
   a displacement element arranged to urge said stator in a first axial direction parallel to an axis of rotation for the torque converter, wherein:
a second plurality of the blades is attached to the third segment and the first plurality of blades is different from the second plurality of blades;
the first and second segments are formed of a single piece of material;
the plate is formed of one only single piece of material;
the plate includes:
   a radial portion extending in a radial direction orthogonal to the axis of rotation;
   a first axial portion extending in the first axial direction from a radial end of the radial portion furthest from the axis of rotation; and,
   a second axial portion, located between the first axial portion and the axis of rotation and extending in the first axial direction from a radial end of the radial portion closest to the axis of rotation;
the displacement element is in contact with the radial portion;
a portion of the displacement element is disposed, in the radial direction between the first and second axial portions;
said torque converter further comprises a fluid,
said stator is arranged to move in a second axial direction, opposite said first axial direction, in response to pressure from said fluid;
said first segment comprises a substantially annular disc having at least one axial protrusion;
said plate comprises at least one indentation axially aligned with said at least one protrusion; and,
the plate and the displacement element are axially disposed between the first and third segments.

* * * * *